United States Patent
Kojima et al.

(10) Patent No.: US 8,403,494 B2
(45) Date of Patent: Mar. 26, 2013

(54) PROJECTION-TYPE DISPLAY APPARATUS WITH A PROJECTION OPTICAL SYSTEM CONFIGURED TO REDUCE SPECKLE

(75) Inventors: Kuniko Kojima, Tokyo (JP); Hayato Takeuchi, Tokyo (JP); Tomohiro Sasagawa, Tokyo (JP); Yuzo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 608 days.

(21) Appl. No.: 12/535,246

(22) Filed: Aug. 4, 2009

(65) Prior Publication Data

US 2010/0033686 A1    Feb. 11, 2010

(30) Foreign Application Priority Data

Aug. 5, 2008   (JP) .................................. 2008-201854
Dec. 8, 2008   (JP) .................................. 2008-312130

(51) Int. Cl.
*G03B 21/14*    (2006.01)
*G03B 21/28*    (2006.01)
*G03B 21/56*    (2006.01)
*G02B 3/08*     (2006.01)
*G02B 13/20*    (2006.01)
*G02B 5/02*     (2006.01)

(52) U.S. Cl. .............. 353/38; 353/76; 353/98; 359/802; 359/742; 359/457; 359/460; 359/707; 359/599

(58) Field of Classification Search ............. 353/38, 353/76, 98; 359/676, 802, 742, 457, 455, 359/456, 460, 707, 599
See application file for complete search history.

(56) References Cited

U.S. PATENT DOCUMENTS

| | | | | |
|---|---|---|---|---|
| 5,675,435 A * | 10/1997 | Ishii et al. | ...................... | 359/460 |
| 6,271,965 B1 * | 8/2001 | Miyata | ........................... | 359/453 |
| 6,502,942 B2 * | 1/2003 | Mori et al. | ...................... | 353/74 |
| 7,075,718 B2 * | 7/2006 | Suzuki et al. | ................. | 359/457 |
| 7,605,978 B2 * | 10/2009 | Endo et al. | ..................... | 359/453 |
| 2008/0158512 A1 * | 7/2008 | Mizushima et al. | ............. | 353/20 |
| 2008/0252863 A1 | 10/2008 | Kojima et al. | | |

FOREIGN PATENT DOCUMENTS

| | | |
|---|---|---|
| JP | 8-313865 A | 11/1996 |
| JP | H11-024169 A | 1/1999 |
| JP | 2001-100317 A | 4/2001 |
| JP | 2002-174860 A | 6/2002 |
| JP | 2003-004914 | 2/2003 |
| JP | 2004-133478 A | 4/2004 |
| JP | 2006-234981 A | 9/2006 |
| JP | 2007-323013 A | 12/2007 |
| JP | 2007-3223049 A | 12/2007 |
| JP | 2008-026624 | 2/2008 |
| JP | 2008-26628 A | 2/2008 |
| JP | 2008-058869 | 3/2008 |
| JP | 2008-096777 | 5/2008 |
| WO | WO 2006/090857 A1 | 8/2006 |

* cited by examiner

*Primary Examiner* — Tony Ko
*Assistant Examiner* — Magda Cruz
(74) *Attorney, Agent, or Firm* — Birch, Stewart, Kolasch & Birch, LLP

(57) ABSTRACT

An image formed on a reflecting optical modulator is magnified by a projection optical system and projected on a backside of a transmission-type screen. The projection optical system is constituted so that a product of an F-number and a projection magnification of the projection optical system is less than 400.

16 Claims, 8 Drawing Sheets

FIG.5

| DMD DEVICE SIZE S1 | 0.66 [INCH] | | | | | | | | |
|---|---|---|---|---|---|---|---|---|---|
| SCREEN SIZE S2 | 65 [INCHES] | | | | | | | | |
| PROJECTION MAGNIFICATION (M) | 98.5 | | | | | | | | |
| PROJECTION OPTICAL SYSTEM F-NUMBER (Fp) | 2.4 | 3 | 3.5 | 4 | 4.5 | 5 | 5.5 | 6 | 6.5 |
| Fp×M | 236 | 295 | 345 | 395 | 443 | 492 | 542 | 591 | 640 |
| SPECKLE NOISE/ SCINTILLATION | PL | PL | PL | PL | NL | NL | NL | NL | NL |

FIG.6

| DMD DEVICE SIZE S1 | 0.7 [INCH] | | | | | | | | |
|---|---|---|---|---|---|---|---|---|---|
| SCREEN SIZE S2 | 50 [INCHES] | | | | | | | | |
| PROJECTION MAGNIFICATION (M) | 71.4 | | | | | | | | |
| PROJECTION OPTICAL SYSTEM F-NUMBER (Fp) | 2.4 | 3 | 3.5 | 4 | 4.5 | 5 | 5.5 | 6 | 6.5 |
| Fp×M | 171 | 214 | 250 | 286 | 321 | 357 | 393 | 429 | 464 |
| SPECKLE NOISE/ SCINTILLATION | PL | PL | PL | PL | PL | PL | PL | NL | NL |

PROJECTION-TYPE DISPLAY APPARATUS WITH A PROJECTION OPTICAL SYSTEM CONFIGURED TO REDUCE SPECKLE

BACKGROUND OF THE INVENTION

1. Field of the Invention

The present invention relates to a projection-type display apparatus that projects and displays an image on a transmission-type screen.

2. Description of the Related Art

The recent trend is to provide a high-brightness light source in order to realize high brightness in a projection-type display apparatus in which a liquid crystal panel or a reflecting optical modulator (a reflecting liquid crystal display or the like) is employed as an image displaying device.

An extra-high pressure mercury lamp, a metal halide lamp, or the like has been used as a light source for the projection-type display apparatus. However, these types of lamps have a shorter lifetime so that a maintenance work to replace them is required frequently. Furthermore, when these types of lamps are employed, an optical system that takes out red, green, and blue from white light of the lamp becomes necessary, so that the configuration of the apparatus becomes complicated and light use efficiency drops.

To solve these problems, a laser source, such as a semiconductor laser, has been tested as a light source. The laser source has a longer lifetime and does not require a maintenance work so frequently. Moreover, the laser source can be directly modulated in accordance with an image to be displayed so that configuration becomes relatively simple with improved light use efficiency. In addition, a color reproduction range can be widened by employing the laser source.

However, the laser source has a high coherence. Therefore, when the laser source is used as a light source in a projection-type display apparatus, a light diffusing material within a transmission-type screen of the projection-type display apparatus interferes with light and thus the displayed image glares (speckle noise or scintillation). Such interference leads to degradation of the picture quality.

In the projection-type display apparatus, it is preferable to reduce the speckle noise or scintillation. For this purpose, a method for prescribing a relationship between an exit pupil diameter and a projection distance of a projection lens and the number of diffused layers of a transmission-type screen has been disclosed in, for example, Japanese Patent Application Laid-open No. H8-313865. Moreover, a method for internally oscillating at least one layer of diffused layers of a transmission-type screen has been disclosed in, for example, Japanese Patent Application Laid-open No. 2001-100317.

The method disclosed in Japanese Patent Application Laid-open No. H8-313865 prescribes a ratio (d/a) of an exit pupil diameter d to a projection distance a of a projection lens to 0.06 or less. However, when the ratio (d/a) is small, there is a problem that a divergence angle of light incident on the transmission-type screen becomes small whereby speckle noise and scintillation is disadvantageously is increased.

On the other hand, the method disclosed in Japanese Patent Application Laid-open No. 2001-100317 has a problem that a mechanism for vibrating the diffused layer of the transmission-type screen is required. Therefore, the size of the apparatus is increased and the cost is increased. Moreover, there is a problem that a device behavior becomes unstable due to vibration of the diffused layer and thus the reliability of image display is not secured.

SUMMARY OF THE INVENTION

It is an object of the present invention to at least partially solve the problems in the conventional technology.

According to an aspect of the present invention, there is provided a projection-type display apparatus that includes a transmission-type screen configured to display an image projected on a backside thereof; a light source configured to emit a light beam; an illuminating optical system configured to propagate the light beam into an optical path; an image displaying device configured to be illuminated in an illuminated area thereof by the light beam propagating through the illuminating optical system and to form an image in the illuminated area; and a projection optical system configured to magnify the image to obtain a magnified image and to project the magnified image on the backside of the transmission-type screen. The projection optical system is constituted so that a product of an F-number and a projection magnification of the projection optical system is less than 400.

According to another aspect of the present invention, there is provided a projection-type display apparatus that includes projection-type display apparatus that includes a transmission-type screen configured to display an image projected on a backside thereof; a reflecting optical modulator configured to form an image; and a projection optical system configured to magnify the image to obtain a magnified image and project the magnified image on the backside of a transmission-type screen, the projection optical system being constituted so that a product of an F-number and a projection magnification of the projection optical system is less than 400.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5 and 6 are diagrams illustrating a relationship between an F-number and a glare phenomenon of the projection optical system shown in FIG. 1;

DETAILED DESCRIPTION OF THE PREFERRED EMBODIMENTS

Exemplary embodiments of the present invention will be explained in detail below with reference to the accompanying drawings. However, the present invention is not limited to these embodiments.

Figure 1:
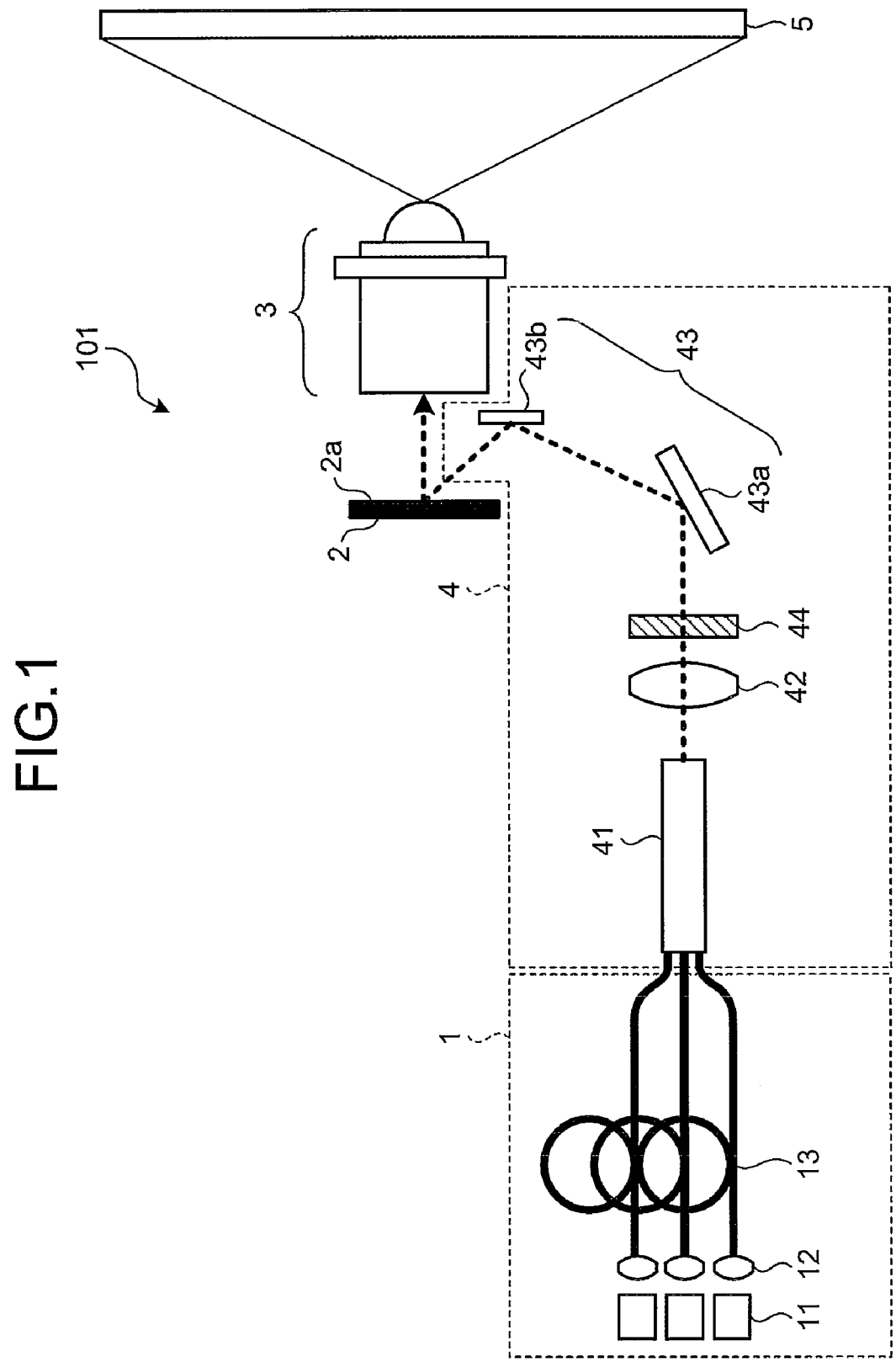
FIG. 1 is a diagram illustrating the configuration of a projection-type display apparatus according to a first embodiment of the present invention.

FIG. 1 is a diagram illustrating the configuration of a projection-type display apparatus 101 according to the first embodiment of the present invention. The projection-type display apparatus 101 is a rear-projection type image displaying apparatus that projects an image on a screen by using a light valve.

The projection-type display apparatus 101 includes a condensing optical system 1, an illuminating optical system 4, a reflecting optical modulator (a reflecting light valve) 2 that acts as an image displaying device, and a projection optical system 3 that magnifies an image of an illuminated surface (an image forming area) 2a of the reflecting optical modulator 2 illuminated by the illuminating optical system 4 and projects the magnified image onto a transmission-type screen 5.

The condensing optical system 1 includes laser sources 11 corresponding to a plurality of colors (three colors in FIG. 1), a plurality of condenser lenses (condensing units) 12 (three lenses in FIG. 1) that condenses light beams emitted from the laser source 11 by using one or more lenses or mirrors, and a plurality of optical fibers 13 (three fibers in FIG. 1) that guides the light beams emitted from the condenser lenses 12 to the illuminating optical system 4.

In the condensing optical system 1, one condenser lens 12 and one optical fiber 13 correspond to one laser source 11. The laser beam emitted from the respective laser sources 11 are guided to the illuminating optical system 4 via the condenser lenses 12 and the optical fibers 13 corresponding to the respective laser sources 11.

The illuminating optical system 4 includes a light intensity equalizing device 41 that equalizes the intensity distribution of the laser beams emitted from the condensing optical system 1 (the optical fibers 13), a relay lens group 42, a diffusion device 44, and a mirror group 43 having a first mirror 43a and a second mirror 43b. The illuminating optical system 4 guides the light beams emitted from the light intensity equalizing device 41 to the reflecting optical modulator 2 by using the relay lens group 42 and the mirror group 43.

The light intensity equalizing device 41 has a function (for example, a function for reducing the unevenness of illuminance) for equalizing the light intensity of the laser beams emitted from the condensing optical system 1. The light intensity equalizing device 41 is arranged inside the illuminating optical system 4 in such a manner that an incoming surface (an inlet end face) of the light intensity equalizing device 41 that is an inlet of light is directed to the optical fiber 13 and an outgoing surface (an outlet end face) that is an outlet of light is directed to the relay lens group 42. The light intensity equalizing device 41 is formed of transparent materials such as glass or resin. The light intensity equalizing device 41 includes a polygonal pillar-shaped rod (referred to as a polygonal pillar-shaped member from a cross sectional shape thereof) of which the inside of the side wall forms a total reflecting surface, a tubular pipe (a tube-shaped member) of which the cross sectional shape is a polygon and the light reflection surface is present inside the pipe, and so on.

When the light intensity equalizing device 41 is in the forms of a multiangular pillar-shaped rod, the light intensity equalizing device 41 reflects light multiple times and then emits the light from an outgoing end (an outlet) thereof by using a total-reflection action between transparent material and air interface. On the other hand, when the light intensity equalizing device 41 is in the forms of a polygonal pipe, the light intensity equalizing device 41 reflects light multiple times and then emits the light from the outlet by using a reflex action of a surface-coated mirror that is directed inside.

The light intensity equalizing device 41 has such a length in a traveling direction of light beam that the light reflected inside multiple times is irradiated with an overlap in the vicinity of the outgoing surface of the light intensity equalizing device 41. As a result, substantially uniform intensity distribution is obtained in the neighborhood of the outgoing surface of the light intensity equalizing device 41. The outgoing beams having the substantially uniform intensity distribution, which are output from the outgoing surface, are guided to the reflecting optical modulator 2 via the relay lens group 42 and the mirror group 43 and then illuminate the illuminated surface 2a of the reflecting optical modulator 2.

The diffusion device (diffusion unit) 44 is arranged downstream of the relay lens group 42. The diffusion device 44 is operative to diffuse the light propagated through the relay lens group 42 and send the diffused light to the mirror group 43 to reduce a speckle. For example, the diffusion device 44 is a holographic diffusion device that outputs a light having a diffusion angle that depends on the type of a hologram pattern formed on a substrate thereof and that mitigates the coherence of the laser sources 11. The coherence of the laser sources 11 can be mitigated more effectively by rotating or vibrating the diffusion device 44.

Although the diffusion device 44 is arranged downstream of the relay lens group 42 in FIG. 1, the configuration is not limited to this arrangement. For example, the diffusion device 44 can be arranged before or after the light intensity equalizing device 41. Furthermore, the coherency of the laser sources 11 can be mitigated still more effectively by combining a plurality of the diffusion devices 44.

The reflecting optical modulator 2 can be DMD (registered trademark) (Digital Micro-mirror Device). The reflecting optical modulator 2 is obtained by arraying mobile micromirrors (for example, hundreds of thousands of pieces) corresponding to pixels in a planar manner and is constituted to change the tilt of each micro-mirror in accordance with pixel information.

Although the relay lens group 42 is shown as one lens in FIG. 1, the relay lens group 42 can contain two or more lenses. Similarly, the number of lenses of the mirror group 43 is not limited to two. The mirror group 43 can contain one lens, or three or more lenses.

Figure 2:
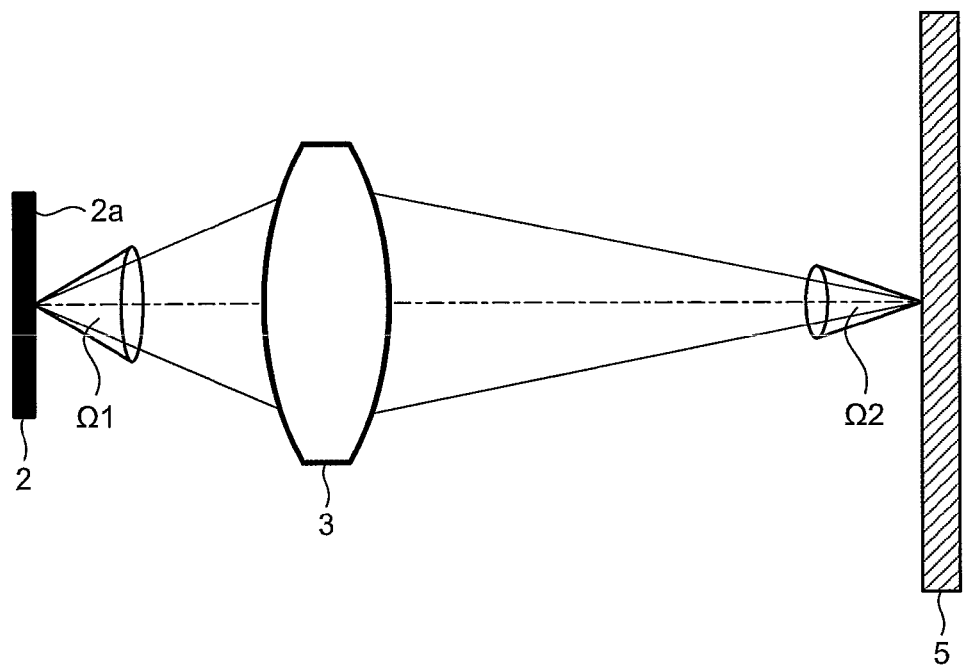
FIG. 2 is a diagram explaining the concept of light propagation of a projection optical system shown in FIG. 1.

Now, light propagation in the projection optical system 3 will be explained. FIG. 2 is a diagram explaining how light propagates in the projection optical system 3 and conceptually illustrates the action (F-number and projection magnification) of the projection optical system 3. In FIG. 2, to typically illustrate the projection optical system 3, the projection optical system 3 is illustrated as one lens element.

The projection optical system 3 is constituted so that the illuminated surface 2a of the reflecting optical modulator 2 and the transmission-type screen 5 have an optically conjugated relation. A size S1 and a divergence angle $\Omega1$ [deg] (see FIG. 2) of the illuminated surface 2a of the reflecting optical modulator 2 and a size S2 and a divergence angle $\Omega2$ [deg] (see FIG. 2) of the transmission-type screen 5 can be geometrical-optically expressed with Equation (1). The divergence angle Ω1 is the maximum cone angle of light emitted from the reflecting optical modulator 2 and the divergence angle Ω2 is the maximum cone angle of light received by the transmission-type screen 5.

$$S1 \times \Omega1 = S2 \times \Omega2 \quad (1)$$

The F-number (Fp) of the projection optical system 3 can be expressed with Equation (2) by employing the divergence angle Ω1 [deg]:

$$Fp = 1/(2 \times \sin(\Omega1/2)) \quad (2)$$

Furthermore, because the projection magnification M of the projection optical system 3 represents a magnification from the size S1 of the illuminated surface 2a of the reflecting optical modulator 2 to the size S2 of the transmission-type screen 5, the projection magnification M can be expressed with Equation (3):

$$M = S2/S1 \quad (3)$$

Figure 3:
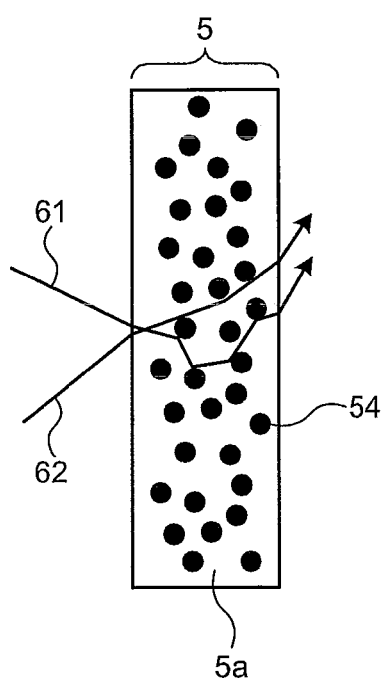
FIG. 3 is a diagram explaining a glare phenomenon that is observed on a transmission-type screen shown in FIG. 1.

Now, why the speckle noise or scintillation is produced on the transmission-type screen 5 will be explained. FIG. 3 is a diagram for explaining why the speckle noise or scintillation is produced on the transmission-type screen 5. In FIG. 3, the cause of generation of a glare phenomenon (scintillation) on the transmission-type screen 5 is schematically illustrated.

As shown in FIG. 3, plural light beams 61 and 62 incident at the same position on the transmission-type screen 5 at different incidence angles may exit the transmission-type screen 5 in the same direction due to the action of a diffused layer 5a (a layer consisting of diffusing materials 54) within the transmission-type screen 5. On the other hand, light beams incident at different positions on the transmission-type screen 5 at the same incidence angle may exit the transmission-type screen 5 in different directions due to the action of the diffused layer 5a. In this manner, light beams incident on the transmission-type screen 5 at various positions and at various incidence angles are diffused in various directions due to the action of the diffused layer 5a. When the light beams exit from the transmission-type screen 5, the light beams exit from various positions and at various outgoing angles. As a result, some of the light beams are reinforced and others are cancelled out. This results into occurrence of brightness unevenness on the transmission-type screen 5. The brightness unevenness is observed as a glare phenomenon such as speckle noise or scintillation.

Figure 4A:
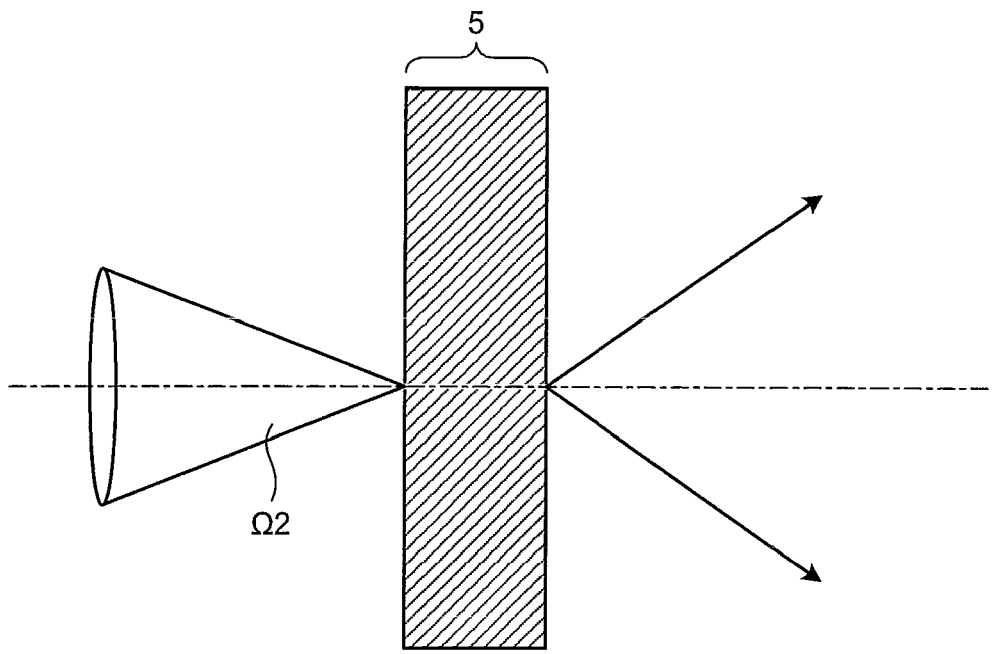
FIGS. 4A and 4B are diagrams illustrating a relationship between the size of the divergence angle of light incident on the transmission-type screen and the diffusion of light emitted from the transmission-type screen.
Figure 4B:
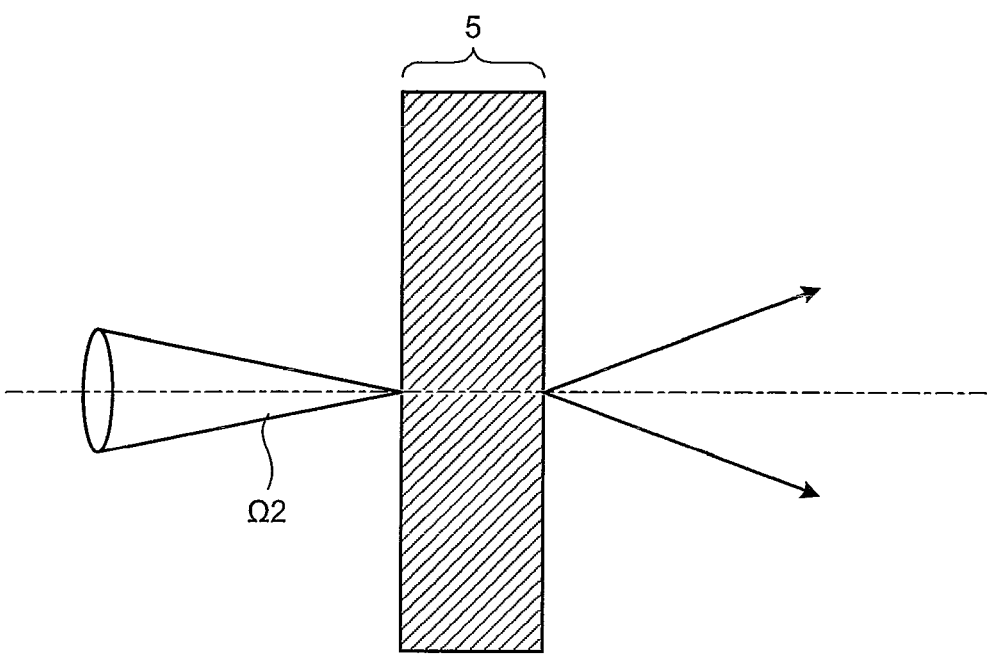

In the first embodiment, the divergence angle Ω2 of light incident on the transmission-type screen 5, which is determined from the F-number and projection magnification M of the projection optical system, is defined appropriately. FIGS. 4A and 4B are diagrams illustrating a relationship between the divergence angle of light incident on the transmission-type screen 5 and the amount of diffusion. In FIGS. 4A and 4B, a relationship between the F-number and scintillation of the projection optical system is schematically illustrated. The divergence angle Ω2 is large in FIG. 4A and small in FIG. 4B.

As illustrated in FIGS. 4A and 4B, the light emitted from the transmission-type screen 5 is diffused in proportion to the divergence angle Ω2 [deg] of light incident on the transmission-type screen 5. In other words, larger divergence angle Ω2 leads to higher diffusion and higher degree of mitigation of glare phenomenon.

The divergence angle Ω2 [deg] of light incident on the transmission-type screen 5 can be calculated from Equation (1) by using the size S1 and divergence angle Ω1 [deg] of the illuminated surface 2a of the reflecting optical modulator 2 and the size S2 of the transmission-type screen 5. This is similar to the fact that the divergence angle Ω2 [deg] is defined by the F-number Fp and projection magnification M of the projection optical system 3. Hereinafter, it will be explained about an experimental result of the glare phenomenon on the transmission-type screen 5 when the F-number Fp and projection magnification M of the projection optical system 3 are changed.

FIGS. 5 and 6 are diagrams illustrating a relationship between the F-number of the projection optical system and the glare phenomenon. FIG. 5 illustrates an experiment result when the size S1 of the illuminated surface 2a of the reflecting optical modulator 2 is 0.66 inch and the size S2 of the transmission-type screen 5 is 65 inches. The projection magnification M for this set of factors can be calculated by using Equation (3) and it is 98.5. The projection magnification M was set to 98.5 and the level of speckle noise and scintillation was measured while changing the F-number Fp of the projection optical system 3 from 2.4 to 6.5. In FIG. 5, PL stands for permissible level and NL stands for non-permissible level of speckle noise and scintillation.

When the F-number Fp of the projection optical system 3 is changed, it has been confirmed in accordance with a visual evaluation how the speckle noise and scintillation on the transmission-type screen 5 are changed. As a result, when the F-number Fp of the projection optical system 3 is from 2.4 to 4, it was observed that the speckle noise and scintillation were in a permissible range.

However, when the F-number Fp of the projection optical system 3 is 4.5 or more, it was observed that the speckle noise and scintillation increased. In this way, the speckle noise and scintillation are in the permissible range when the F-number Fp of the projection optical system 3 is from 2.4 to 4. In this case, it is understood that the condition that the product of the F-number Fp and projection magnification M of the projection optical system 3 is 400 or less is satisfied.

FIG. 6 illustrates an experimental result when the size S1 of the illuminated surface 2a of the reflecting optical modulator 2 is 0.7 inch and the size S2 of the transmission-type screen 5 is 50 inches. In FIG. 6, there is illustrated an experimental result when the projection-type display apparatus 101 is constituted so that the projection magnification M (71.4) is small than that of FIG. 5.

In the projection-type display apparatus 101, similarly to FIG. 5, when the F-number Fp of the projection optical system 3 is changed, it has been confirmed in accordance with a visual evaluation how the speckle noise and scintillation on the transmission-type screen 5 are changed. As a result, when the F-number Fp of the projection optical system 3 is from 2.4 to 5.5, it was observed that the speckle noise and scintillation were in the permissible range. In this way, when the speckle noise and scintillation are in the permissible range, it is understood that the condition that the product of the F-number Fp and projection magnification M of the projection optical system 3 is 400 or less is satisfied, similarly to FIG. 5.

Therefore, according to the first embodiment, the projection-type display apparatus 101 is constituted to satisfy Fp×M<400 whereby the divergence angle of light incident on the transmission-type screen 5 falls within a predetermined range.

Although the reflecting optical modulator 2 is used as a light valve of the projection-type display apparatus 101 in the first embodiment, a transmission or reflecting liquid crystal display can be used as the light valve.

Moreover, although the laser source 11 is used as a light source in the first embodiment, an extra-high pressure mercury lamp or a metal halide lamp can be used as the laser source.

In this manner, according to the first embodiment, because the projection-type display apparatus 101 is constituted so that the product of the F-number Fp and projection magnification M of the projection optical system 3 is smaller than 400, the speckle noise and scintillation on the transmission-type screen 5 can be reduced even if a high-brightness light source is used.

Moreover, according to the first embodiment, because the laser source 11 is used as a light source, it is possible to constitute an optical system having a longer lifetime and better color reproducibility. According to the first embodiment, because the illuminating optical system 4 includes therein the diffusion device 44, the speckle noise and scintillation can be efficiently reduced. Furthermore, according to the first embodiment, the light beams emitted from the laser sources 11 are guided to the illuminating optical system 4 by using the optical fibers 13, the optical system can be flexibly arranged and have high introduction efficiency of light beam. Because the light beams are further reflected in the optical fibers 13 many times, the speckle noise and scintillation can be reduced to obtain a high-uniformity image. Moreover, according to the first embodiment, because the light beams emitted from the condensing optical system 1 are equalized by using the light intensity equalizing device 41, a good image without the unevenness of illuminance can be obtained and the speckle noise and scintillation can be reduced.

As described above, according to the first embodiment, the product (the value of Fp×M) of the F-number Fp and projection magnification M of the projection optical system 3 is set below a predetermined level (below 400). As a result, the divergence angle of light incident on the transmission-type screen 5 falls within a predetermined range, the speckle noise and scintillation can be reduced to display a good-quality image even if high-brightness light is projected on the transmission-type screen 5.

Next, a second embodiment of the present invention will be explained with reference to FIGS. 7 to 11. In the second embodiment, at least two diffused layers are arranged in the transmission-type screen 5 and the diffusion ratio (haze value) of the diffused layer is set below a predetermined level.

Figure 7:
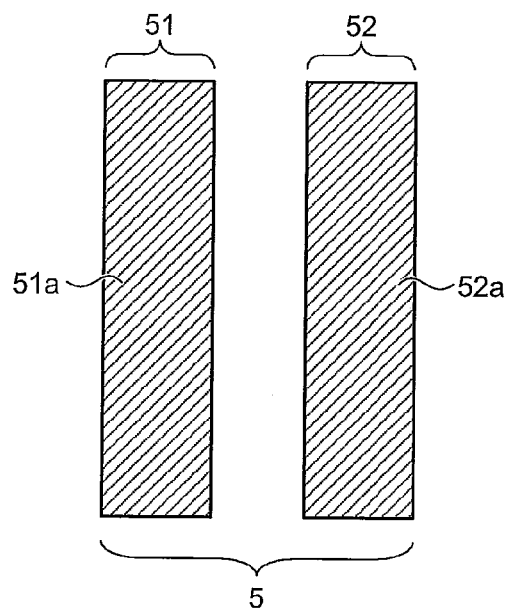
FIGS. 7 to 9 are diagrams illustrating the configuration of an optical system of a projection-type display apparatus according to a second embodiment of the present invention.
Figure 8:
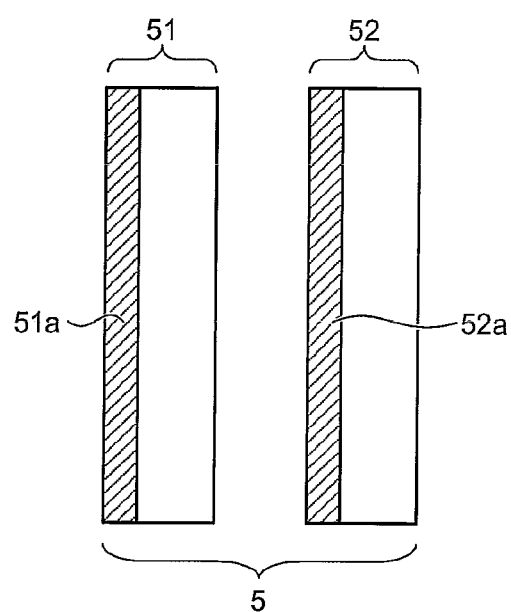
Figure 9:
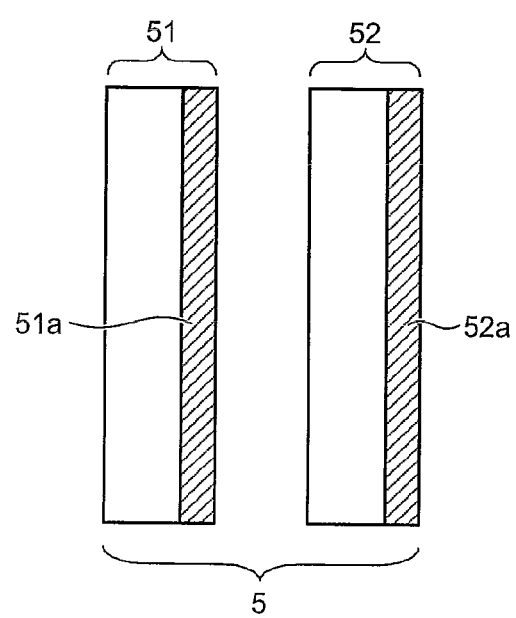

FIGS. 7 to 9 are diagrams illustrating the configuration of an optical system of a projection-type display apparatus according to the second embodiment of the present invention. The transmission-type screen 5 that is an optical system of the projection-type display apparatus 101 includes a Fresnel lens (a Fresnel lens sheet) 51 that converts incident beams into substantially parallel beams and emits the parallel beams and a lenticular lens (a lenticular lens sheet) 52 that emits the outgoing beams emitted from the Fresnel lens 51 as predetermined diffused light. Furthermore, the transmission-type screen 5 includes diffused layers 51a and 52a in addition to the Fresnel lens 51 and the lenticular lens 52.

The diffused layer (first light diffusion layer) 51a can be arranged at any position within the Fresnel lens 51 and can have any layer thickness. Moreover, the diffused layer (second light diffusion layer) 52a can be arranged at any position within the lenticular lens 52 and can have any layer thickness.

As an example of the diffused layers 51a and 52a, it will be explained about the transmission-type screen 5 illustrated in FIGS. 7 to 9. In the transmission-type screen 5 illustrated in FIG. 7, the Fresnel lens 51 and the lenticular lens 52 respectively have the diffused layers 51a and 52a as a whole. Moreover, in the transmission-type screen 5 illustrated in FIG. 8, the Fresnel lens 51 and the lenticular lens 52 respectively have the diffused layers 51a and 52a that are respectively arranged only at the inlet sides of the lenses. Furthermore, in the transmission-type screen 5 illustrated in FIG. 9, the Fresnel lens 51 and the lenticular lens 52 respectively have the diffused layers 51a and 52a that are respectively arranged only at the outlet sides of the lenses.

The combination of the Fresnel lens 51 and the lenticular lens 52 is not limited to the arrangements illustrated in FIGS. 7 to 9. Other combinations can be employed. Moreover, the transmission-type screen 5 may include three or more diffused layers.

The diffused layers 51a and 52a contains diffusing materials. The content of the diffusing materials can be expressed by a haze value (%). It will be explained about when the haze value of the diffused layer 51a is a haze value H1 and the haze value of the diffused layer 52a is a haze value H2.

When the haze value H1 of the diffused layer 51a or the haze value H2 of the diffused layer 52a is large, the speckle noise and scintillation are low. However, when the haze value H1 of the diffused layer 51a is large, there is a problem that a front brightness is low and sharpness is low. On the other hand, when the haze value H2 of the diffused layer 52a is large, a front brightness is low and reduction in the speckle noise and scintillation becomes small when the haze value H2 is not smaller than a certain value.

Figure 10:
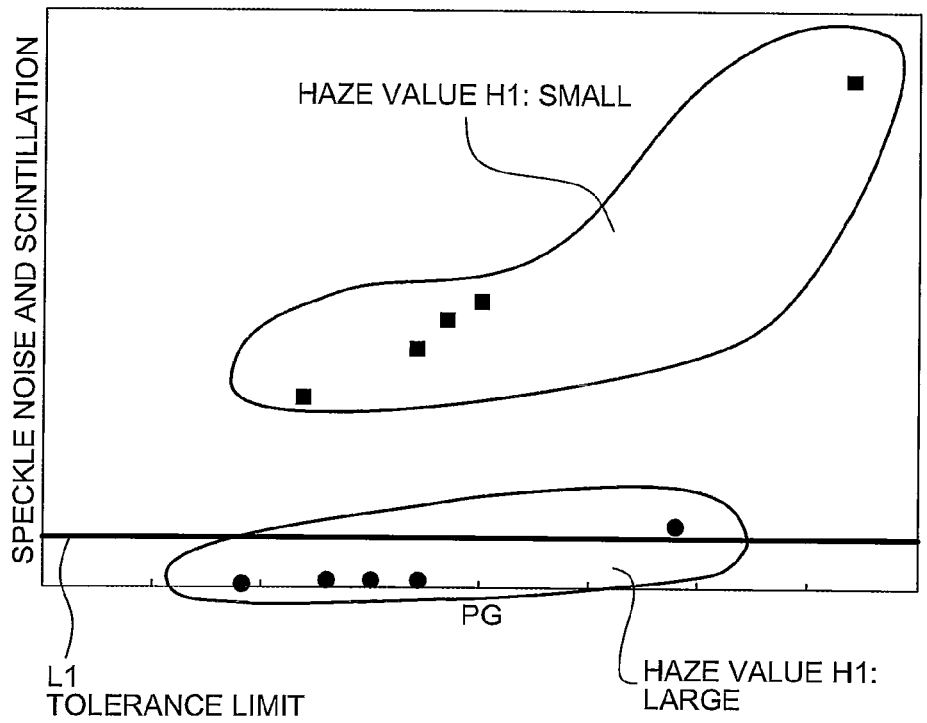
FIG. 10 is a diagram illustrating a result obtained by verifying PG and a decreasing effect of glare phenomenon when haze values are changed.

Now, it will be explained about a peak gain (PG) indicative of the brightness of the transmission-type screen 5 and the decreasing effect of a glare phenomenon (speckle noise and scintillation) when the haze value H1 of the diffused layer 51a and the haze value H2 of the diffused layer 52a are changed in various ways. FIG. 10 is a diagram illustrating a result obtained by verifying the PG and the decreasing effect of glare phenomenon when the haze values are changed. In FIG. 10, there is illustrated a relationship between the haze value H1 of the diffused layer 51a and the PG and decreasing effect of glare phenomenon (speckle noise and scintillation) at the haze value H1. In addition, the specific value of the haze value H1 of the diffused layer 51a used for verification is 40% when the haze value H1 is small and is 72% when the haze value H1 is large. At this time, the haze value H2 of the diffused layer 52a of the five kinds of the lenticular lenses 52 combined with the Fresnel lens 51 is 80% to 95%.

It has been confirmed about the PG and the decreasing effect of speckle noise and scintillation when two kinds of Fresnel lenses when the haze value H1 of the diffused layer 51a is large and small and five kinds of lenticular lenses when the haze value H2 of the diffused layer 52a is different are combined in various ways.

As a result, when the haze value H1 of the diffused layer 51a is small, the PG can be decreased depending on the type of the lenticular lens 52. However, when the haze value H1 of the diffused layer 51a is small, the decreasing effect of speckle noise and scintillation does not reach a permissible level (a tolerance limit L1 of speckle noise and scintillation) in all cases even if the Fresnel lens 51 is combined with any kind of the lenticular lens 52.

On the other hand, when the haze value H1 of the diffused layer 51a is large, the decreasing effect of the speckle noise and scintillation becomes remarkably high and thus the decreasing effect reaches the tolerance limit L1 in many cases if the haze value H2 of the diffused layer 52a is larger than a predetermined value (if PG becomes small). In other words, when the haze value H1 of the diffused layer 51a is large, it is understood that the decreasing effect of the speckle noise and scintillation is high.

Figure 11:
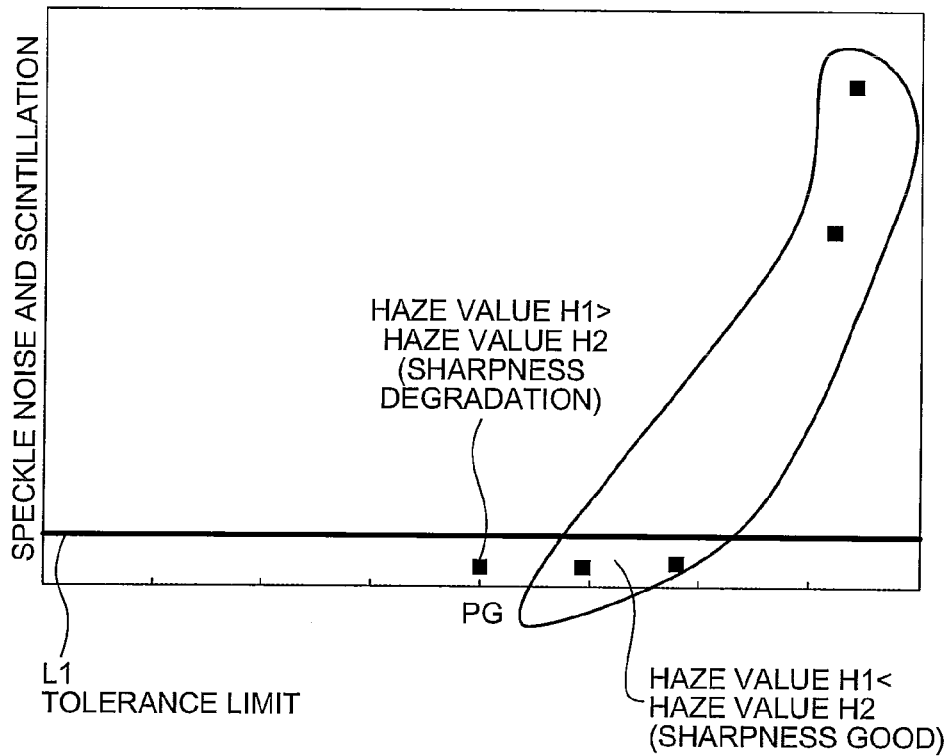
FIG. 11 is a diagram illustrating a result obtained by verifying PG, a decreasing effect of glare phenomenon, and sharpness when haze values are changed.

Next, the verification is performed on the PG, the decreasing effect of speckle noise and scintillation, and the sharpness when the lenticular lens 52 of which the haze value H2 of the diffused layer 52a is 80% and the five kinds of the Fresnel lenses 51 are combined in various ways. FIG. 11 is a diagram illustrating a result obtained by verifying the PG, the decreasing effect of glare phenomenon, and the sharpness when the haze values are changed. In FIG. 11, there is illustrated a relationship between the haze value H1 of the diffused layer 51a and the PG, the decreasing effect of speckle noise and scintillation, the degree of sharpness at the haze value H1.

The haze values H1 of the diffused layers 51a of the five kinds of the Fresnel lenses 51 are 40% to 82% and the decreasing effect of speckle noise and scintillation is high when the haze value H1 is 82% (this is higher than 80% that is the haze value H1 of the diffused layer 51a). However, the degradation of sharpness is remarkable. In this manner, the decreasing effect of speckle noise and scintillation becomes high when the haze value H1 of the diffused layer 51a is large. However, it is understood that the sharpness is degraded when the haze value H1 is larger than the haze value H2 of the diffused layer 52a. Therefore, by employing the haze value H1 of the diffused layer 51a smaller than the haze value H2 of the diffused layer 52a, the decreasing effect of speckle noise and scintillation can be increased and the sharpness can be improved. Therefore, according to the second embodiment, the haze value H1 is set high and also the haze value H1 is set smaller than the haze value H2.

As described above, according to the second embodiment, because the transmission-type screen 5 is constituted by using the diffused layer 51a of which the haze value H1 is large and also is smaller than the haze value H2 of the diffused layer 52a, the speckle noise and scintillation can be reduced to display a good-quality image.

Next, a third embodiment of the present invention will be explained with reference to FIGS. 12 and 13. According to the third embodiment, the diffused layer 52a is constituted so that the diffused layer 52a of the lenticular lens 52 contains at least two kinds of diffusing materials (diffusing elements).

Figure 12:
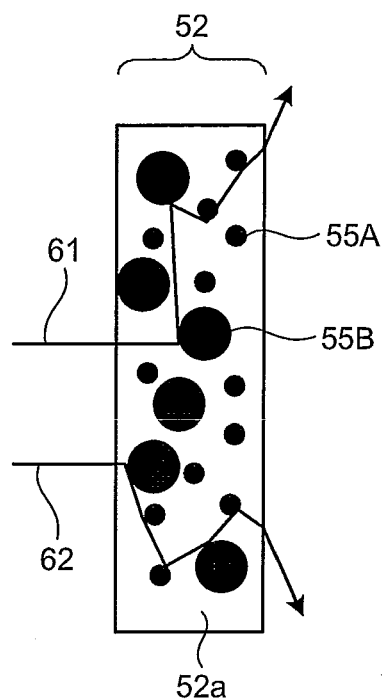
FIGS. 12 and 13 are diagrams illustrating the configuration of an optical system of a projection-type display apparatus according to a third embodiment of the present invention.
Figure 13:
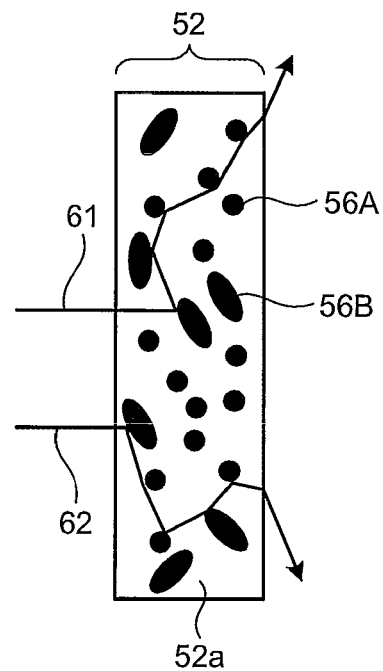

FIGS. 12 and 13 are diagrams illustrating the configuration of an optical system of a projection-type display apparatus according to the third embodiment of the present invention. In FIGS. 12 and 13, the structure of the diffused layer 52a of the lenticular lens 52 is conceptually illustrated. The transmission-type screen 5 that is an optical system of the projection-type display apparatus 101 is constituted to include the lenticular lens 52. The diffused layer 52a of the lenticular lens 52 contains at least two kinds of diffusing materials. The diffused layer 52a is constituted by combining diffusing materials whose the material (refractive index), the size, and the shape are different.

FIG. 12 illustrates an example of the diffused layer in which the sizes of the diffusing materials are different. FIG. 13 illustrates an example of the diffused layer in which the sizes and shapes of the diffusing materials are different. As illustrated in FIG. 12, the diffused layer 52a of the lenticular lens 52 contains at least two kinds of diffusing materials 55A and 55B of which the sizes are different. Moreover, as illustrated in FIG. 13, the diffused layer 52a of the lenticular lens 52 contains at least two kinds of diffusing materials 56A and 56B of which the sizes and shapes are different. In this way, the light beams 61 and 62 incident on the lenticular lens 52 are irregularly diffused and are emitted to an observer compared to a situation where the diffused layer 52a contains one kind of diffusing material.

As described above, according to the third embodiment, because the projection-type display apparatus 101 is constituted so that the diffused layer 52a of the lenticular lens 52 contains at least two kinds of diffusing materials, the light beams 61 and 62 incident on the lenticular lens 52 are irregularly diffused and are emitted to the observer. Therefore, the decreasing effect of speckle noise and scintillation is increased and thus a good image can be obtained.

Next, the fourth embodiment of the present invention will be explained with reference to FIGS. 14 and 15. According to the fourth embodiment, the diffused layer 51a is constituted so that the diffused layer 51a of the Fresnel lens 51 contains at least two kinds of diffusing materials (diffusing elements).

Figure 14:
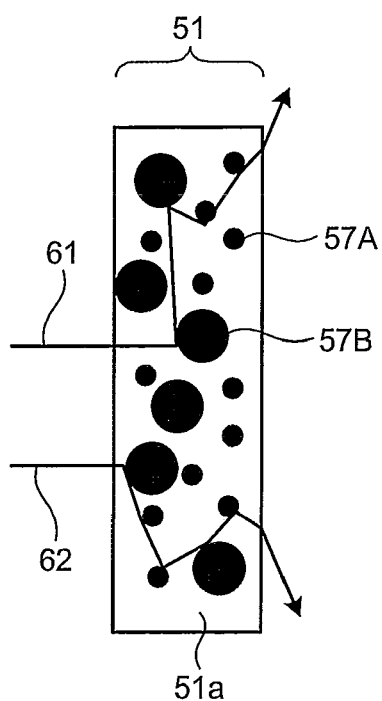
FIGS. 14 and 15 are diagrams illustrating the configuration of an optical system of a projection-type display apparatus according to a fourth embodiment of the present invention.
Figure 15:
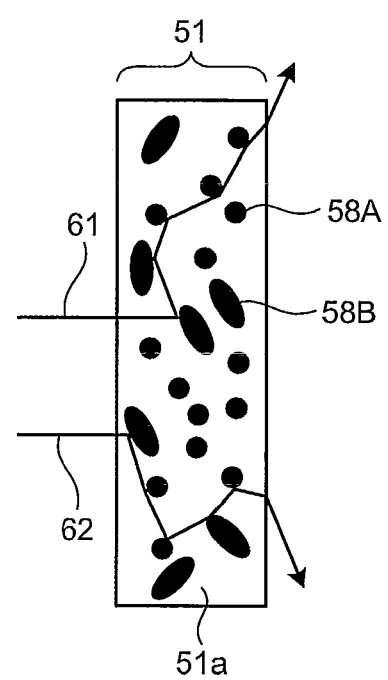

FIGS. 14 and 15 are diagrams illustrating the configuration of an optical system of a projection-type display apparatus according to the fourth embodiment of the present invention. In FIGS. 14 and 15, the structure of the diffused layer 51a of the Fresnel lens 51 is conceptually illustrated. The transmission-type screen 5 that is an optical system of the projection-type display apparatus 101 is constituted to include the Fresnel lens 51. The diffused layer 51a of the Fresnel lens 51 contains at least two kinds of diffusing materials. The diffused layer 51a is constituted by combining diffusing materials whose the material (refractive index), the size, and the shape are different.

FIG. 14 illustrates an example of the diffused layer in which the sizes of the diffusing materials are different. FIG. 15 illustrates an example of the diffused layer in which the sizes and shapes of the diffusing materials are different. As illustrated in FIG. 14, the diffused layer 51a of the Fresnel lens 51 contains at least two kinds of diffusing materials 57A and 57B of which the sizes are different. Moreover, as illustrated in FIG. 15, the diffused layer 51a of the Fresnel lens 51 contains at least two kinds of diffusing materials 58A and 58B of which the sizes and shapes are different. In this way, the light beams 61 and 62 incident on the Fresnel lens 51 are irregularly diffused and are emitted to an observer compared to a situation where the diffused layer 51a contains one kind of diffusing material.

As described above, according to the fourth embodiment, because the projection-type display apparatus 101 is constituted so that the diffused layer 51a of the Fresnel lens 51 contains at least two kinds of diffusing materials, the light beams 61 and 62 incident on the Fresnel lens 51 are irregularly diffused and are emitted to the observer. Therefore, the decreasing effect of speckle noise and scintillation is increased and thus a good image can be obtained.

Next, the fifth embodiment of the present invention will be explained with reference to FIGS. 16 to 19. In the embodiments described above, the materials, the shapes, and the sizes of the diffusing materials contained in the diffused layer 51a of the Fresnel lens 51 and the diffused layer 52a of the lenticular lens 52 are different. However, in the fifth embodiment, diffusing elements are appended to the outgoing surface of the Fresnel lens 51 or the lenticular lens 52.

Figure 16:
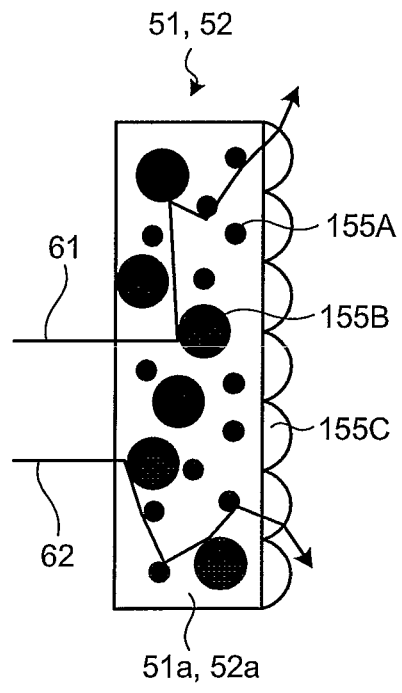
FIGS. 16 to 19 are diagrams illustrating the configuration of an optical system of a projection-type display apparatus according to a fifth embodiment of the present invention.
Figure 17:
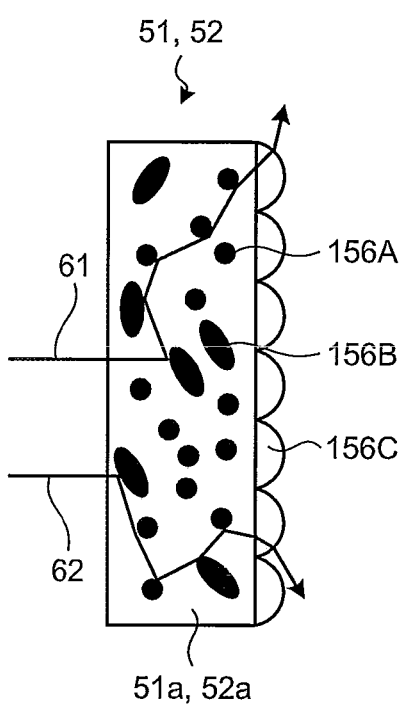

FIGS. 16 and 17 are diagrams illustrating the configuration of an optical system of a projection-type display apparatus according to the fifth embodiment of the present invention. In FIGS. 16 and 17, the structure of the diffused layer 51a or the diffused layer 52a of the Fresnel lens 51 or the lenticular lens 52 is conceptually illustrated. The transmission-type screen 5 that is an optical system of the projection-type display apparatus 101 is constituted to include the Fresnel lens 51. The diffused layer 51a of the Fresnel lens 51 contains at least two kinds of diffusing materials (three kinds in FIGS. 16 and 17). The diffused layer 51a is constituted by combining diffusing materials whose the material (refractive index), the size, and the shape are different and a diffused layer having a lens action.

As illustrated in FIG. 16, the diffused layer 51a or the diffused layer 52a of the Fresnel lens 51 or the lenticular lens 52 contains two kinds of diffusing materials 155A and 155B of which the sizes are different and a diffusing element 155C that has a lens structure. In this way, the light beams 61 and 62 incident on the Fresnel lens 51 or the lenticular lens 52 are irregularly diffused and are emitted to an observer compared to a situation where the diffused layer 51a contains one kind of diffusing element.

Similarly, as illustrated in FIG. 17, the diffused layer 51a or the diffused layer 52a of the Fresnel lens 51 or the lenticular lens 52 contains two kinds of diffusing materials 156A and 156B of which the sizes and shapes are different and a diffusing element 156C having a lens structure. In this way, the light beams 61 and 62 incident on the Fresnel lens 51 or the lenticular lens 52 are irregularly diffused and are emitted to the observer compared to the fact that the diffused layer 51a contains one kind of diffusing element.

Figure 18:
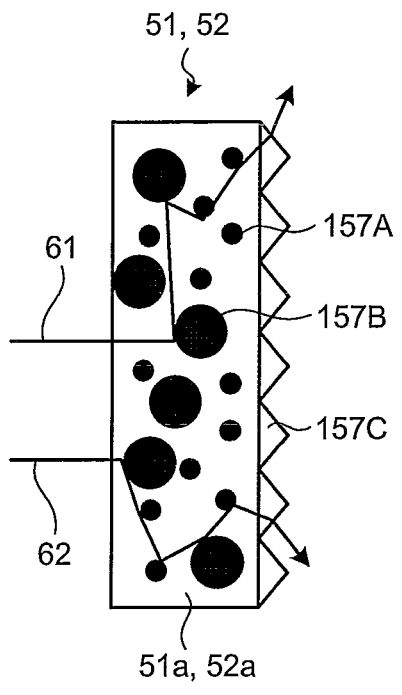

Furthermore, as illustrated in FIG. 18, the diffused layer 51a or the diffused layer 52a of the Fresnel lens 51 or the lenticular lens 52 contains two kinds of diffusing materials 157A and 157B of which the sizes are different and a diffusing element 157C having a prism lens structure. In this way, the light beams 61 and 62 incident on the Fresnel lens 51 or the lenticular lens 52 are irregularly diffused and are emitted to the observer compared to the fact that the diffused layer 51a contains one kind of diffusing element.

Figure 19:
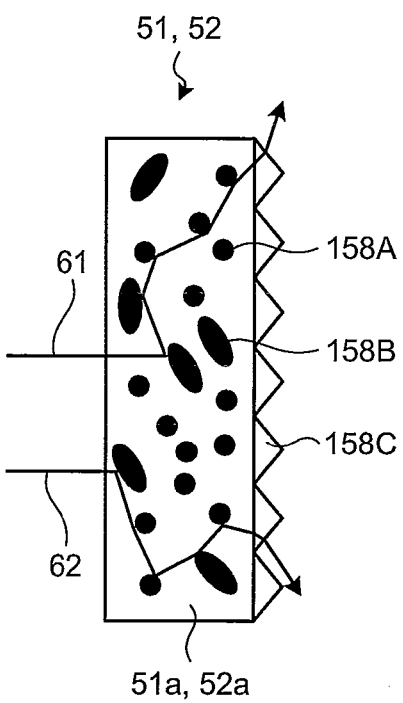

Similarly, as illustrated in FIG. 19, the diffused layer 51a or the diffused layer 52a of the Fresnel lens 51 or the lenticular lens 52 contains two kinds of diffusing materials 158A and 158B of which the sizes and shapes are different and a diffusing element 158C having a prism lens structure. In this way, the light beams 61 and 62 incident on the Fresnel lens 51 or the lenticular lens 52 are irregularly diffused and are emitted to the observer compared to a situation where the diffused layer 51a contains one kind of diffusing element.

In FIGS. 16 to 19, the diffused layer 51a or the diffused layer 52a contains three kinds of different diffusing elements. However, the diffusing elements are not limited to three kinds. For example, the diffused layer 51a or the diffused layer 52a may contain two kinds of diffusing elements, or four or more kinds of diffusing elements. Moreover, in FIGS. 16 to 19, the diffusing element is arranged at the outlet side of the Fresnel lens 51 or the lenticular lens 52. However, the arrangement position of the diffusing element is not limited to the outlet side. For example, the diffusing element may be arranged at the inlet side of the Fresnel lens 51 or the lenticular lens 52. Furthermore, the diffusing elements 155C and 156C illustrated in FIGS. 16 and 17 have a lens structure and the diffusing elements 157C and 158C illustrated in FIGS. 18 and 19 have a prism structure. However, these structures are not limited to the lens structure and the prism structure.

As described above, according to the fifth embodiment, because the projection-type display apparatus 101 is constituted so that the diffused layer 51a or the diffused layer 52a of the Fresnel lens 51 or the lenticular lens 52 contains at least two kinds of diffusing elements, the light beams 61 and 62 incident on the Fresnel lens 51 or the lenticular lens 52 are irregularly diffused and are emitted to an observer. Therefore, the decreasing effect of speckle noise and scintillation is increased and thus a good image can be obtained.

As described above, according to an aspect of the present invention, it is possible to reduce speckle noise and scintillation and display a good-quality image by employing a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type display apparatus comprising:
a transmission-type screen configured to display an image projected on a backside thereof;
a light source configured to emit a laser beam;
an illuminating optical system configured to propagate the laser beam into an optical path;
an image displaying device configured to be illuminated in an illuminated area thereof by the laser beam propagating through the illuminating optical system and to form an image in the illuminated area; and
a projection optical system configured to magnify the image to obtain a magnified image and to project the magnified image on the backside of the transmission-type screen, wherein
the projection optical system is constituted so that a product of an F-number and a projection magnification of the projection optical system is less than 400,
wherein the transmission-type screen includes:
a Fresnel lens configured to convert an incident laser beam into a substantially parallel light and to output the parallel light; and
a lenticular lens configured to convert the parallel light into a diffused light, and
wherein:
the Fresnel lens has a first light diffusion layer that diffuses the incident laser beam and outputs the diffused light as a first diffused light,
the lenticular lens has a second light diffusion layer that further diffuses the first diffused light and outputs the diffused light as a second diffused light,
a haze value of the first light diffusion layer is smaller than that of the second light diffusion layer, and
the haze value of the first light diffusion layer is at least 72% and the haze value of the second light diffusion layer is at least 80%.

2. The projection-type display apparatus according to claim 1, wherein the second light diffusion layer contains at least two kinds of diffusing elements.

3. The projection-type display apparatus according to claim 2, wherein diffusing elements are further appended to an outgoing surface of the second light diffusion layer.

4. The projection-type display apparatus according to claim 1, wherein the first light diffusion layer contains at least two kinds of diffusing elements.

5. The projection-type display apparatus according to claim 4, wherein diffusing elements are further appended to an outgoing surface of the first light diffusion layer.

6. The projection-type display apparatus according to claim 1, wherein the light source is a laser source.

7. The projection-type display apparatus according to claim 6, wherein the illuminating optical system includes a diffusion unit that diffuses the laser beam and transmits diffused laser beam.

8. The projection-type display apparatus according to claim 6, further comprising an optical fiber that is arranged between the light source and the illuminating optical system and guides the laser beam emitted from the light source to the illuminating optical system.

9. The projection-type display apparatus according to claim 1, wherein the illuminating optical system includes a light intensity equalizing device that equalizes light intensities of the laser beam emitted from the light source.

10. The projection-type display apparatus according to claim 1, wherein each of the first and second light diffusion layers contains two kinds of diffusing elements of different materials, shapes or sizes, and wherein diffusing elements are further appended to the outgoing surfaces of the first and second light diffusion layers, respectively.

11. A projection-type display apparatus comprising:

a transmission-type screen configured to display an image projected on a backside thereof;

a reflecting optical modulator configured to form an image; and a projection optical system configured to magnify the image to obtain a magnified image and project the magnified image on the backside of a transmission-type screen, the projection optical system being constituted so that a product of an F-number and a projection magnification of the projection optical system is less than 400, wherein the transmission-type screen includes:

a Fresnel lens configured to convert an incident light beam into a substantially parallel light and to output the parallel light; and a lenticular lens configured to convert the parallel light into a diffused light, and wherein:

the Fresnel lens has a first light diffusion layer that diffuses the incident light beam and outputs the diffused light as a first diffused light, the lenticular lens has a second light diffusion layer that further diffuses the first diffused light and outputs the diffused light as a second diffused light, a haze value of the first light diffusion layer is smaller than that of the second light diffusion layer, and the haze value of the first light diffusion layer is at least 72% and the haze value of the second light diffusion layer is at least 80%.

12. The projection-type display apparatus according to claim 11, wherein the second light diffusion layer contains at least two kinds of diffusing elements.

13. The projection-type display apparatus according to claim 12, wherein diffusing elements are further appended to an outgoing surface of the second light diffusion layer.

14. The projection-type display apparatus according to claim 11, wherein the first light diffusion layer contains at least two kinds of diffusing elements.

15. The projection-type display apparatus according to claim 14, wherein diffusing elements are further appended to an outgoing surface of the first light diffusion layer.

16. The projection-type display apparatus according to claim 11, wherein each of the first and second light diffusion layers contains two kinds of diffusing elements of different materials, shapes or sizes, and wherein diffusing elements are further appended to the outgoing surfaces of the first and second light diffusion layers, respectively.

* * * * *